(12) United States Patent
Iyer et al.

(10) Patent No.: US 11,248,897 B2
(45) Date of Patent: Feb. 15, 2022

(54) METHOD OF MEASURING MISALIGNMENT OF A ROTATING FLEXIBLE SHAFT ASSEMBLY

(71) Applicant: Goodrich Corporation, Charlotte, NC (US)

(72) Inventors: Raghu Iyer, New Hartford, NY (US); Kyle Johnson, Rome, NY (US)

(73) Assignee: Goodrich Corporation, Charlotte, NC (US)

( * ) Notice: Subject to any disclaimer, the term of this patent is extended or adjusted under 35 U.S.C. 154(b) by 436 days.

(21) Appl. No.: 16/280,674

(22) Filed: Feb. 20, 2019

(65) Prior Publication Data
US 2020/0263971 A1 Aug. 20, 2020

(51) Int. Cl.
*G01B 5/25* (2006.01)
*F16C 1/02* (2006.01)

(52) U.S. Cl.
CPC . *G01B 5/25* (2013.01); *F16C 1/02* (2013.01)

(58) Field of Classification Search
CPC .......... G01B 5/25; G01B 21/24; G01B 11/27; F16C 1/02; F16C 2326/06; F16C 2326/43; F16D 3/72
USPC .......................................................... 33/645
See application file for complete search history.

(56) References Cited

U.S. PATENT DOCUMENTS

| | | |
|---|---|---|
| 3,187,439 A | 6/1965 | Leach |
| 4,033,042 A | 7/1977 | Bently |
| 4,148,013 A | 4/1979 | Finn et al. |
| 4,874,245 A | 10/1989 | Spillman, Jr. et al. |
| 5,514,952 A * | 5/1996 | Parkinson ................ G01B 7/02 324/207.24 |
| 6,782,766 B2 * | 8/2004 | Parkinson ............... G01L 3/104 73/862.328 |
| 6,981,423 B1 * | 1/2006 | Discenzo .................. G01L 3/12 73/800 |
| 7,322,250 B1 * | 1/2008 | Discenzo ................ G01L 1/241 73/800 |

(Continued)

FOREIGN PATENT DOCUMENTS

CN 103528804 A 1/2014
RU 5450 U1 11/1997

(Continued)

OTHER PUBLICATIONS

Extended European Search Report for EP Application No. 19209550.3, dated Jul. 6, 2020, 7 pages.

*Primary Examiner* — Yaritza Guadalupe-McCall
(74) *Attorney, Agent, or Firm* — Kinney & Lange, P.A.

(57) ABSTRACT

A method for sensing misalignment of a rotating shaft includes rotating the shaft. A distance from a sensor on the shaft to a first rim of a first coupling mounted to an end of the shaft is sensed as the shaft rotates. A change in the distance from the first sensor to the first rim of the first coupling is determined based on the sensed distance. An angle of the first coupling based on the change in the distance from the first sensor to the first rim of the first coupling during one revolution of the shaft is determined based on the sensed change in the distance from the first sensor to the first rim. An angle of the shaft is determined based on the sensed distance from the first sensor to the first rim of the first coupling representing the sensed change in the distance from the first sensor to the first rim.

15 Claims, 3 Drawing Sheets

(56) References Cited

U.S. PATENT DOCUMENTS

| | | | |
|---|---|---|---|
| 9,346,561 B2* | 5/2016 | VanBuskirk | B64C 27/14 |
| 2005/0044968 A1* | 3/2005 | Southward | G01L 3/109 |
| | | | 73/862.324 |
| 2007/0233329 A1 | 10/2007 | Altieri et al. | |
| 2009/0055129 A1* | 2/2009 | Altieri | B64F 5/60 |
| | | | 702/182 |
| 2015/0031464 A1* | 1/2015 | Silvestri | F16C 1/04 |
| | | | 464/148 |
| 2015/0051003 A1* | 2/2015 | Julian | F16D 3/005 |
| | | | 464/79 |
| 2017/0170773 A1* | 6/2017 | Donolo | H02P 29/66 |
| 2017/0191531 A1* | 7/2017 | Barreto | F16C 19/546 |
| 2019/0085890 A1* | 3/2019 | Iyer | F16C 1/02 |
| 2020/0124409 A1* | 4/2020 | Jozokos | F01D 25/285 |
| 2020/0263546 A1* | 8/2020 | Ibrahim | F01D 5/026 |
| 2020/0263971 A1* | 8/2020 | Iyer | G01B 11/27 |
| 2020/0378849 A1* | 12/2020 | Kakaley | G01B 11/272 |

FOREIGN PATENT DOCUMENTS

| | | | | |
|---|---|---|---|---|
| RU | 2152011 C1 | 6/2000 | | |
| WO | WO-2020236671 A1 * | 11/2020 | | G01L 3/1457 |

* cited by examiner

METHOD OF MEASURING MISALIGNMENT OF A ROTATING FLEXIBLE SHAFT ASSEMBLY

BACKGROUND

The present disclosure generally relates to measurement of a rotating shaft. In particular, the present disclosure relates to measuring misalignment of a rotating flexible shaft assembly.

Flexible shaft assemblies are used to transmit power between two devices, such as between an engine and a helicopter main rotor gearbox when the two devices are not perfectly aligned. Flexible elements on the driveshaft can be used to accommodate misalignments between the shaft and the devices. In some cases, it is necessary to limit the flexing of the flexible elements such that the flexible elements can operate without breaking. Often, specific applications for a driveshaft require specific values of misalignment based on analysis and often add a factor for safety. After installation of flexible shaft assemblies, operators often desire to know how much shaft misalignment occurs during operation.

Existing methods for measuring misalignment of shafts fall short when utilized for rotating shafts due to sensors becoming dislodged, limited space for internal sensors, and damage or failure to strain gauges incorporated with the sensors.

SUMMARY

A method for sensing misalignment of a rotating shaft includes rotating the shaft aligned along a shaft axis. A first coupling with a first rim and a first axis is mounted to a first end of the shaft and a second coupling with a second rim and a second axis is mounted to a second end of the shaft. A first sensor is coupled to a portion of the shaft such that the first sensor rotates with the shaft. A distance from the first sensor to the first rim of the first coupling is sensed as the shaft rotates with the first sensor. A change in the distance from the first sensor to the first rim of the first coupling is determined based on the sensed change in the distance from the first sensor to the first rim of the first coupling. An angle of the first coupling is determined based on the sensed change in the distance from the first sensor to the first rim of the first coupling during one revolution of the shaft. An angle of the shaft is determined based on the sensed distance from the first sensor to the first rim of the first coupling representing the sensed change in the distance from the first sensor to the first rim of the first coupling during one revolution of the shaft.

A flexible shaft assembly includes a shaft, first and second couplings, and a sensor assembly. The first coupling includes a first outer rim and is mounted to a first end of the shaft. The second coupling is mounted to a second end of the shaft. The sensor assembly is mounted to the shaft and includes a collar and a first sensor. The collar is mounted onto an exterior surface of the shaft. The first sensor faces the first outer rim of the first coupling and is coupled to the collar such that the first sensor rotates with the collar as the collar is rotated with the shaft.

A shaft misalignment measuring system includes a first coupling, a second coupling, a shaft, and a sensor assembly. The first coupling includes a first radially outer rim, wherein the second coupling includes a second radially outer rim. The shaft is connected to and extends between the first coupling and the second coupling. The sensor assembly is mounted on the shaft and includes a collar, a first sensor, and a second sensor. The collar is attached to the shaft. The first sensor is mounted to a first location of the collar and is configured to measure a change in angle of the first radially outer rim as the shaft rotates. The second sensor is mounted to a second location of the collar and is configured to measure a change in angle of the second radially outer rim as the shaft rotates.

The present summary is provided only by way of example, and not limitation. Other aspects of the present disclosure will be appreciated in view of the entirety of the present disclosure, including the entire text, claims, and accompanying figures.

Figure 1A:
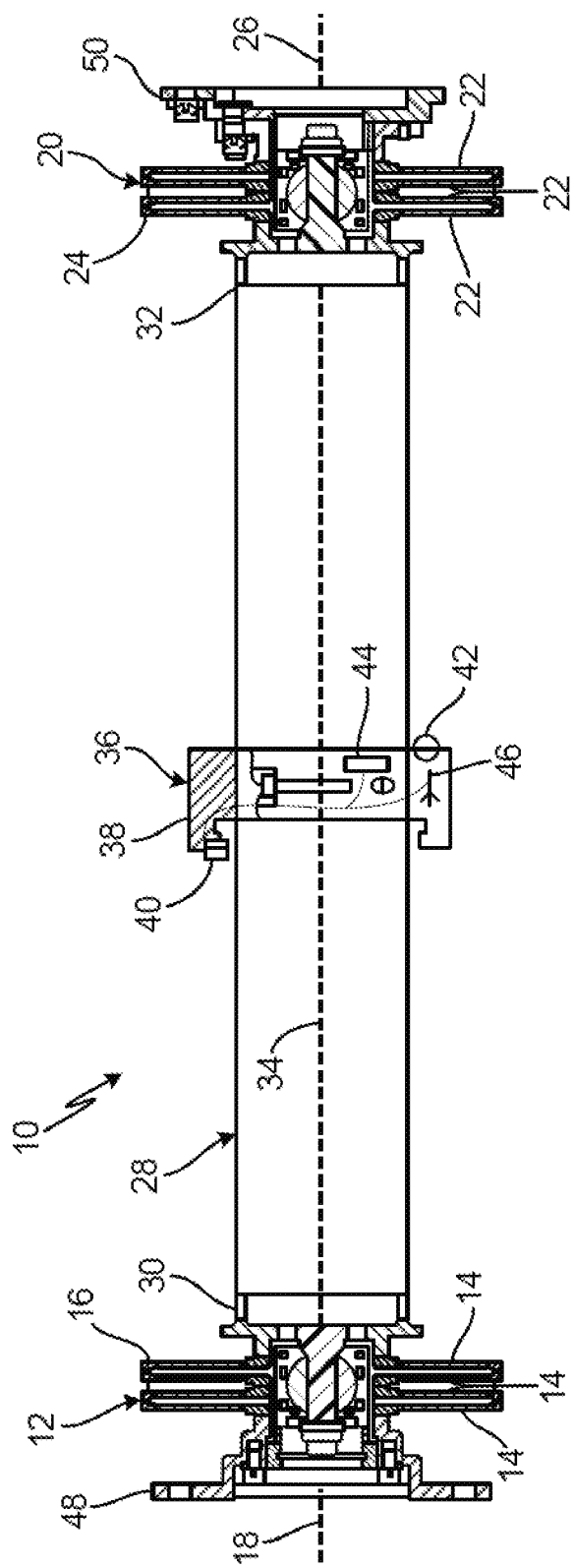
FIG. 1A is a side view of a flexible shaft assembly with a sensor system, shown with the flexible shaft assembly in a first, aligned position.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In the present disclosure, a light-weight sensor or sensors are attached to the non-flexing portion of a flexible driveshaft to measure a degree of misalignment between the shaft and a coupling. Measurement data can be either stored in memory associated with the sensor for retrieval or transmitted to receivers in the airframe or on the ground.

FIG. 1A is a side view of flexible shaft assembly 10 in a first position and shows first coupling 12 (with first diaphragms 14, first outer rim 16, and first coupling axis 18), second coupling 20 (with second diaphragms 22, second outer rim 24, and second coupling axis 26), shaft 28 (with first end 30, second end 32, and shaft axis 34), sensor assembly 36 (with collar 38, first sensor 40, second sensor 42, power source 44, and transmitter 46), first flange 48, and second flange 50.

Flexible shaft assembly 10 is a flexible shaft assembly for use in a power transmission system. In one example, flexible shaft assembly 10 is used in a helicopter to connect the engine to a main rotor gear box. In another example, flexible shaft assembly 10 can be connected to an accessory gear box. In other embodiments, flexible shaft assembly 10 can be connected to and installed in a vehicle or non-vehicle application such as an industrial turbine engine or any type of power transmission system where this type of flexible shaft assembly may be used. In general, flexible shaft assembly 10 includes a torque-carrying shaft or tube 28 that cannot flex, but can twist under torque loading.

First coupling 12 and second coupling 20 are flexible connection elements or joints. In this embodiment, flexible shaft assembly 10 includes a flexible diaphragm coupling (i.e., first coupling 12 and second coupling 20) at both ends of shaft 28. In another non-limiting embodiment, one or both of first coupling 12 and second coupling 20 can be replaced with crown spline which are typically limited to a small amount of angular misalignment. In another non-limiting embodiment, one or both of first coupling 12 and second coupling 20 can be replaced with a gear coupling, disc coupling, bellow coupling or flat and/or flexible beam type coupling. First diaphragms 14 and second diaphragms 22 are flexible plates or discs of solid, resilient material. In this embodiment, there are four of each of first and second diaphragms 14 and 22, respectively. In other embodiments, first coupling 12 and second coupling 20 can include more or less than two of first diaphragms 14 and/or second diaphragms 22. First outer rim 16 is a circumferentially outer-most portion of first coupling 12. In this example, first outer rim 16 is a connection point or joint between two of first diaphragms 14 closest to shaft 28. First coupling axis 18 is an axis extending along an axial direction of first coupling 12 and that passes through a centerpoint of first coupling 12.

Second outer rim 24 is a circumferentially outer-most portion of second coupling 20. In this example, second outer rim 24 is a connection point or joint between two of second diaphragms 22 closest to shaft 28. Second coupling axis 26 is an axis extending along an axial direction of second coupling 20 and that passes through a centerpoint of second coupling 20. Shaft 28 is a cylindrical driveshaft. First end 30 and second end 32 are opposite ends of shaft 28. Shaft axis 34 is a centerline axis of shaft 28.

Sensor assembly 36 is an assembly including collar 38, first sensor 40, second sensor 42, power source 44, and transmitter 46. In another example, sensor assembly 36 can include a transceiver, a transducer, a processor, and/or programmable memory that is mounted in or onto and that is electrically connected to one or more of first sensor 40, second sensor 42, power source 44, and transmitter 46. In other embodiments, sensor assembly 36 can include a single sensor (e.g., one of either first sensor 40 or second sensor 42). Collar 38 is a split clamping collar.

First sensor 40 and second sensor 42 can be optical sensors. In one example, first and/or second sensors 40 and 42 can be an optical, infrared, or laser sensor. In this example, first and second sensors 40 and 42 each include an emitter configured to emit a source signal and a signal sensing device operably connected to each emitter. Power source 44 is a power-supplying component. In this example, power source 44 can be a battery or an armature coil that generates power as power source 44 is rotated along with shaft 28. Transmitter 46 is a data transmission device. In one example, transmitter 46 can be a wireless communication device such as a wireless transceiver or a Bluetooth transmission device.

In one embodiment, first flange 48 and second flange 50 are the ends of the flexible driveshaft 10. First flange 48 and/or second flange 50 can also be a spline shaft or an adapter mechanism connected to first coupling 12 and second coupling 20 respectively to transfer torque to the power transmission system. In another non-limiting embodiment, first coupling 12 and/or second coupling 20 can be directly connected to the engine, the accessory gear box, the main rotor gear box and/or a tail propeller of a helicopter independently from shaft 28. Shaft 28 can be connected to first coupling 12 at shaft end 30 and second coupling 20 at shaft end 32. Traditionally, gearboxes are left relatively permanent and are rarely removed except for an overhaul or major repair procedure. The flexible driveshaft 10 is typically the component that is removed/installed more frequently.

In this example, flexible shaft assembly 10 is connected to one or more of the accessory gear box, the main rotor gear box and/or the tail propeller of an aircraft (e.g., helicopter) or vehicle via first flange 48 and/or second flange 50. First coupling 12 is coupled and/or mounted to first end 30 of shaft 28 and to first flange 48. First diaphragms 14 are inter-connected to each other at their radially inward and radially outward edges. First outer rim 16 is located on a radially outer portion of one of first diaphragms 14 that is closest to shaft 28. First coupling axis 18 passes through a radial center of first coupling 12. In the embodiment shown in FIG. 1A, first coupling axis 18 also passes through a radial center point of first flange 48 and is parallel to and coaxial with shaft axis 34.

Second coupling 20 is coupled and/or mounted to second end 30 of shaft 28 and to second flange 50. Second diaphragms 22 are inter-connected to each other at their radially inward and radially outward edges. Second outer rim 24 is located on a radially outer portion of one of second diaphragms 22 that is closest to shaft 28. Second coupling axis 26 passes through a radial center of second coupling 20. In the embodiment shown in FIG. 1A, second coupling axis 26 also passes through a radial center point of second flange 50 and is parallel to and coaxial with shaft axis 34.

Shaft 28 is connected to first coupling 12 at first end 30 and to second coupling 20 at second end 32. Shaft 28 is coupled to first and second couplings 12 and 20 such that first coupling 12, second coupling 20, and shaft 28 are rotationally synchronous and rotate with each of the others. For example, as first coupling 12 is driven to rotate by another component, the torque from first coupling 12 is transferred to shaft 28 which in turn transfers that torque to second coupling 20, or vice versa. Shaft axis 34 extends axially through a radial centerpoint of shaft 28. In the embodiment shown in FIG. 1A, shaft axis 34 is parallel and coaxial with first coupling axis 18 and with second coupling axis 26.

Sensor assembly 36 is secured to shaft 28 via collar 38, which clamps onto shaft 28. In this embodiment, collar 38 of sensor assembly 36 is located generally at a mid-point of shaft 28. First sensor 40 and second sensor 42 are mounted into or onto opposing axial ends of collar 38. In this example, first sensor 40 and second sensor 42 are mounted 180 degrees apart from each other about a circumference of collar 38. First sensor 40 and second sensor 42 are synchronized at 180 degrees such that they are angularly aligned at 180 degrees from each other. Second sensor 42 is mounted at a second circumferential position that is located 180 degrees relative to the first circumferential position of first sensor 40.

Power source 44 is attached to collar 38 and is electrically connected to one or more of first sensor 40, second sensor 42, and transmitter 46. Transmitter 46 is attached to collar 38 and is electrically connected to one or more of first sensor 40, second sensor 42, and power source 44. First flange 48 is coupled to first coupling 12 such that first coupling 12 and first flange 48 rotate with each other (e.g., do not rotate relative to each other). Second flange 50 is coupled to second coupling 20 such that second coupling 20 and second flange 50 rotate with each other (e.g., do not rotate relative to each other).

Flexible shaft assembly 10 can be utilized with an engine or motor to transfer torque to different elements with rotational axes occupying non-coaxial alignment during different phases of operation. First coupling 12 and second coupling 20 maintain a parallel alignment of first coupling axis 18 and second coupling axis 26 relative to each other by flexing and bending as first coupling 12 and second coupling 20 move during operation of the vehicle or aircraft. In another example, the flexibility of first coupling 12 and second coupling 20 accounts for assembly and design tolerances which prevent a perfect alignment between first coupling axis 18, second coupling axis 26, and shaft axis 34. First coupling 12 and second coupling 20 also provide a restorative force or spring force to bias shaft 28 back into alignment with first coupling axis 18 and with second coupling axis 26. In one non-limiting embodiment, ball joints with no axial clearance are disposed inside of first coupling 12 and second coupling 20 limit the axial displacement of shaft 28 by limiting an axial expansion of each of first coupling 12 and second coupling 20. The ball joints within first coupling 12 and second coupling 20 also prevent first diaphragms 14 and second diaphragms 22 from compressing in onto each other. Additionally, these ball joints can wear over time and may eventually allow for axial displacement of shaft 28. As such, measuring the axial displacement of shaft 28 would provide information on when the components of flexible shaft assembly 10 (e.g., the ball joints) need to be replaced.

First diaphragms 14 and second diaphragms 22 flex and bend during operation of the motor or engine allowing for angular and axial misalignment of shaft 28 with first and/or second flanges 48 and 50 while also maintaining the mechanical connections between shaft 28 and first and second couplings 12 and 20. Additionally, first diaphragms 14 and second diaphragms 22 provide for the transmission of power between first and second flanges 48 and 50 as first and second flanges 48 and 50 move relative to each other due to design tolerances, baselines errors during installation, and/or dynamic and thermal forces during operation.

First outer rim 16 provides a target point along the circumferential edge of the axially inner-most first diaphragm 14 upon which a source signal emitted by first sensor 40 is reflected off of and back towards first sensor 40. Second outer rim 24 provides a target point along the circumferential edge of the axially inner-most second diaphragm 22 upon which a source signal emitted by second sensor 42 is reflected off of and back towards second sensor 42. In this example, shaft 28 rotates to drive other components within the vehicle such as an accessory gearbox, a main rotor gearbox, or an intermediate gearbox in a tail section of a helicopter. In other examples, shaft 28 can be connected to one or more other shafts instead of being connected to first and second flanges 48 and 50. In this example, flexible shaft assembly 10 can rotate at a rate of 4,000 to 24,000 revolutions per minute. As will be discussed further with respect to FIG. 2, sensor assembly 36 measures the misalignment (and/or a change in the misalignment) of shaft 28 relative to first coupling axis 18, to second coupling axis 26, or to first flange 48, and to second flange 50.

Collar 38 clamps and affixes sensor assembly 36 onto shaft 28 such that sensor assembly and its components rotate along with shaft 28. First sensor 40 senses a distance from first sensor 40 to first outer rim 16 of first coupling 12 as shaft 28 rotates with first sensor 40. Second sensor 42 senses a distance from second sensor 42 to second outer rim 24 of second coupling 20 as shaft 28 rotates with second sensor 42. Power source 44 provides power via electric current to sensor assembly 36. In this example, transmitter 46 transmits a sensed distance from first sensor 40 to first outer rim 16 of first coupling 12 and/or a sensed distance from second sensor 42 to second outer rim 24 of second coupling 20 to a receiver (see e.g., receiver 52 shown in FIG. 2) located externally from shaft 28.

Flexible shaft assembly 10, in one example, utilizes sensor assembly 36 to communicate with external devices via one or more networks, such as one or more wireless or wired networks or both. One or more components of sensor assembly 36 (e.g., transmitter 46) and/or a component on the aircraft or vehicle can be a network interface card, such as an ethernet card, an optical transceiver, a radio frequency transceiver, or any other type of device that can send and receive information. Other examples of such network interfaces can include Bluetooth, 3G, 4G, and Wi-Fi devices as well as Universal Serial Bus (USB). In some examples, communication with an aircraft, a vehicle, or a ground communication station can be performed via a communications bus, such as, for example, an Aeronautical Radio, Incorporated (ARINC) standard communications protocol. In another example, communication with aircraft, the vehicle, or the ground communication station can be performed via a communications bus, such as, for example, a Controller Area Network (CAN) bus. It should be understood that communications for sensor assembly 36 can be made using any combination of wired, wireless, or optical communications. First flange 48 either transfers torque to or receives torque from shaft 28. Likewise, second flange 50 either receives torque from or transfers torque to shaft 28.

Figure 1B:
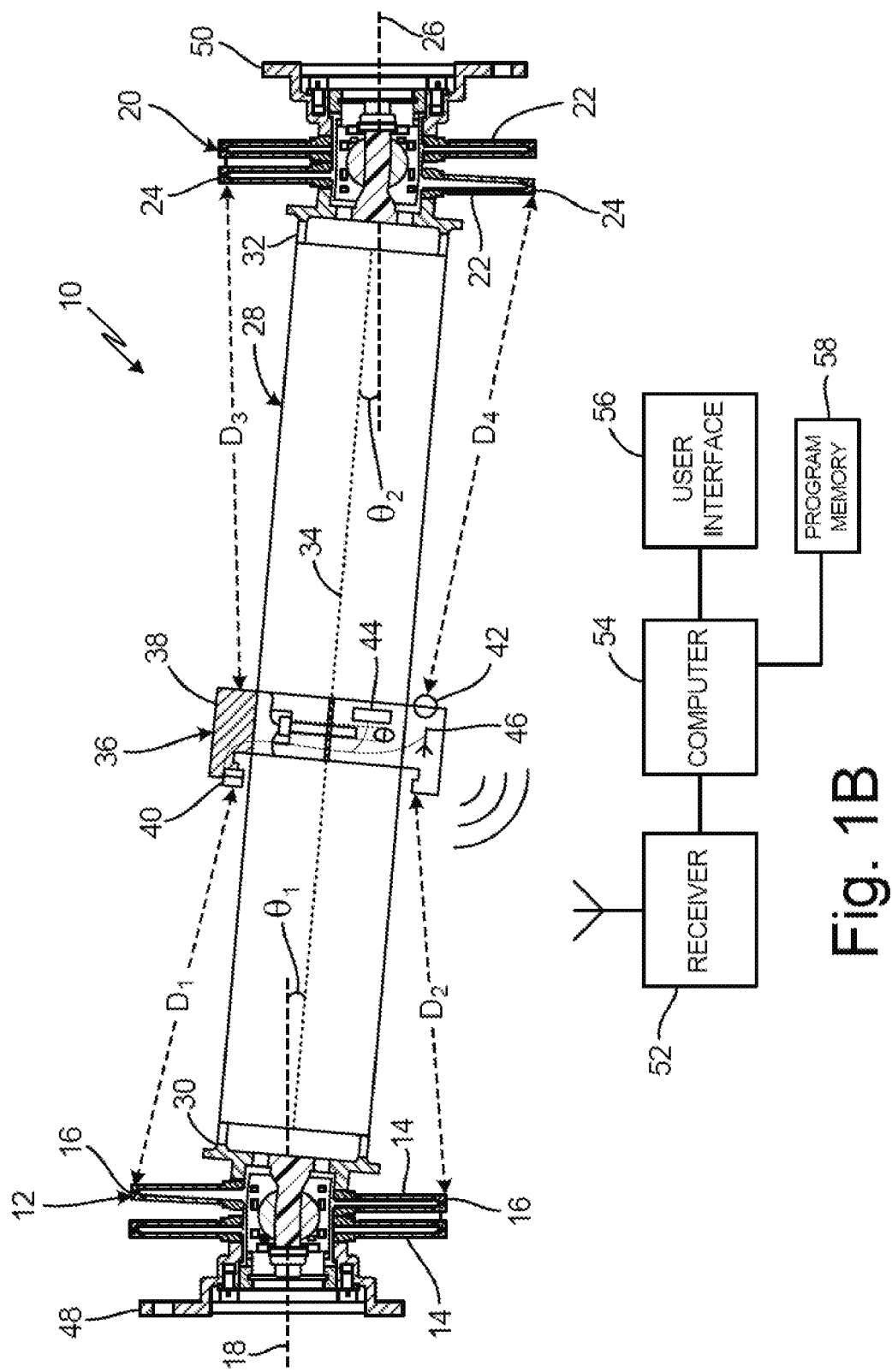
FIG. 1B is a side view of the flexible shaft assembly with the sensor system, shown with the flexible shaft assembly in a second, misaligned position.

FIG. 1B is a side view of flexible shaft assembly 10 in a second misaligned position and shows first coupling 12 (with first diaphragms 14, first outer rim 16, and first coupling axis 18), second coupling 20 (with second diaphragms 22, second outer rim 24, and second coupling axis 26), shaft 28 (with first end 30, second end 32, and shaft axis 34), sensor assembly 36 (with collar 38, first sensor 40, second sensor 42, power source 44, and transmitter 46), first flange 48, second flange 50, first angle $\theta_1$, second angle $\theta_2$, receiver 52, computer 54, user interface 56, and program memory 58. FIG. 1B also shows first distance $D_1$, second distance $D_2$, third distance $D_3$, and fourth distance $D_4$.

First angle $\theta_1$ is an angle between first coupling axis 18 and shaft axis 34. Second angle $\theta_2$ is an angle between second coupling axis 26 and shaft axis 34. Receiver 52 is a device for receiving a wireless data signal and converting that wireless data signal into usable information. Computer 54 is an electronic device for processing digital information and may include a controller, a processor, a microprocessor, a microcontroller, an application-specific integrated circuit (ASIC), a digital signal processor (DSP), a field programmable gate-array (FPGA), or other equivalent discrete or integrated logic circuitry. User interface 56 is a device, either physical or virtual, by which information and/or data is displayed to and/or received by a user (e.g., a person). In one example, program memory 58 can be a computer-readable memory used to store program instructions for execution by one or more processors of computer 54. For instance, program memory 58 can be used by software or applications executed to temporarily store information during program execution.

First distance $D_1$ is a distance between first sensor 40 and a circumferential top portion of first outer rim 16. In this example, first sensor 40 is shown positioned on a circumferential top of collar 38 (as compared to the position of second sensor 42 shown in FIG. 1B as being located on a circumferential bottom of collar 38). Second distance $D_2$ is a distance between a circumferential bottom portion of collar 38 and a circumferential bottom portion first outer rim 16. Third distance $D_3$ is a distance between a circumferential top location of second outer rim 24 and a circumferential top portion of collar 38. Fourth distance $D_4$ is a distance between second sensor 42 and a circumferential bottom portion of second outer rim 24. In this example, second sensor 42 is shown positioned on a circumferential bottom of collar 38 (as compared to the position of first sensor 40 shown in FIG. 1B as being located on a circumferential top of collar 38).

Receiver 52 is electrically connected to at least one of computer 54, user interface 56, and program memory 58. In this embodiment, receiver 52 is located externally from flexible shaft assembly 10. In another embodiment, receiver 52 (along with one or more of computer 54, user interface 56, and program memory 58) can be located on or within the vehicle or aircraft. In yet another embodiment, receiver 52 (along with one or more of computer 54, user interface 56, and program memory 58) can be located externally from the vehicle or aircraft, such as in a user console. Computer 54 is electrically connected to receiver 52, user interface 56, and to program memory 58. User interface 56 is electrically connected to computer 54. Program memory 58 is electrically connected to at least computer 54 and may also be connected to receiver 52 and user interface 56. In some non-limiting embodiments, program memory 58 can be located inside or outside of the physical unit of computer 54.

In an example where first coupling axis 18 and second coupling axis 26 are aligned with shaft axis 34, first angle $\theta_1$ and second angle $\theta_2$ are zero (see e.g., FIG. 1A). In such an example with first angle $\theta_1$ and second angle $\theta_2$ being zero, first distance $D_1$ and second distance $D_2$ would be equal and third distance $D_3$ and fourth distance $D_4$ would also be equal. As first flange 48 moves relative to shaft 28 and first coupling axis 18 becomes misaligned from shaft axis 34, first angle $\theta_1$ becomes greater than zero. As first angle $\theta_1$ becomes greater than zero, first distance $D_1$ becomes greater or smaller than second distance $D_2$ such that an absolute value of a difference between first distance $D_1$ and second distance $D_2$ is greater than zero. As second flange 50 moves relative to shaft 28 and second coupling axis 26 becomes misaligned from shaft axis 34, second angle $\theta_2$ becomes greater than zero. As second angle $\theta_2$ becomes greater than zero, third distance $D_3$ becomes greater or smaller than fourth distance $D_4$ such that an absolute value of a difference between third distance $D_3$ and fourth distance $D_4$ is greater than zero.

Receiver 52 receives wireless communications from transmitter 46 of sensor assembly 36 and communicates those signals to computer 54. Computer 54 receives communications from receiver 52, and can then send those communications to one or both of user interface 56 or program memory 58. User interface 56 receives communications from computer 54 and displays them in a usable format for a user. Program memory 58 store communications from computer 54 to be accessed and/or used at a later time As shaft 28 rotates with sensor assembly 36, first sensor 40 and second sensor 42 continuously measure the distance to each of first outer rim 16 and second outer rim 24, respectively. Each of first, second, third, and fourth distances $D_1$, $D_2$, $D_3$, and $D_4$ are determined by taking a known speed of the signals sent from either of first sensor 40 and second sensor 42 and multiplying those known speeds by an amount of time (e.g., time of flight) the signals take to be reflected back to and received by first and second sensors 40 and 42. In the embodiment shown, first distance $D_1$, second distance $D_2$, third distance $D_3$, and fourth distance $D_4$ are shown to illustrate differences between first distance $D_1$ and second distance $D_2$, and between third distance $D_3$ and fourth distance $D_4$. These differences are created by the bending of first diaphragms 14 and second diaphragms 22 as shown in FIG. 1B.

As shaft 28 rotates, first sensor 40 and second sensor 42 also rotate with shaft 28 and sense the distance from first sensor 40 and second sensor 42 to first outer rim 16 and to second outer rim 24, respectively.

Sensing a distance from first sensor 40 to first outer rim 16 of first coupling 12 includes emitting a signal (e.g., optical) from first sensor 40. The signal is reflected with first outer rim 16 of first coupling 12 towards first sensor 40. The reflected signal from first outer rim 16 of first coupling 12 is detected by first sensor 40. The distance from first sensor 40 to first outer rim 16 of first coupling 12 is then determined based on a time of flight for the reflected signal to reach first sensor 40. Sensing a distance from second sensor 42 to second outer rim 24 of second coupling 20 includes emitting a signal (e.g., optical) from second sensor 42. The signal is reflected with second outer rim 24 of second coupling 20 towards second sensor 42. The reflected signal from second outer rim 24 of second coupling 20 is detected by second sensor 42. The distance from second sensor 42 to second outer rim 24 of second coupling 20 is then determined based on a time of flight for the reflected signal to reach second sensor 42.

The sensed distances from first sensor 40 to first outer rim 16 of first coupling 12 and from second sensor 42 to second outer rim 24 of second coupling 20 are communicated to transmitter 46 mounted on shaft 28. The sensed distances from first sensor 40 to first outer rim 16 of first coupling 12 and from second sensor 42 to second outer rim 24 of second coupling 20 are transmitted by transmitter 46 to receiver 52, which in this non-limiting embodiment is located externally from shaft 28. The sensed distances from first sensor 40 to first outer rim 16 of first coupling 12 and from second sensor 42 to second outer rim 24 of second coupling 20 are communicated to computer 54 connected to receiver 52.

A change in the distance from first sensor 40 to first outer rim 16 of first coupling 12 is determined based on the sensed distance from first sensor 40 to first outer rim 16 of first coupling 12. An angle of first coupling 12 based on the change in the distance from first sensor 40 to first outer rim 16 of first coupling 12 is determined based on the sensed change in the distance from first sensor 40 to first outer rim 16 of first coupling 12. An angle of shaft 28 based on the sensed distance from first sensor 40 to first outer rim 16 of first coupling 12 representing the sensed change in the distance from first sensor 40 to first outer rim 16 of first coupling 12 is determined.

In another non-limiting embodiment, a signal indicative of an angle of shaft 28 can be sent to program memory 58 during operation of shaft 28. A value of the angle of shaft 28 can be stored in program memory 58. Program memory 58 can be accessed to retrieve the value of the angle of shaft 28. The value of the angle of shaft 28 can be communicated to a user after operation of shaft 28.

In this embodiment, minimum and maximum values of the distances from first outer rim 16 to first sensor 40 correspond with first distance $D_1$ as a maximum and second distance $D_2$ as a minimum distance from first outer rim 16 to first sensor 40 as first sensor 40 rotates with shaft 28. Likewise, minimum and maximum values of the distances from second outer rim 24 to second sensor 42 correspond with third distance $D_3$ as a minimum and fourth distance $D_4$ as a maximum distance from second outer rim 24 to second sensor 42 as second sensor 42 rotates with shaft 28.

Flexible shaft assembly 10 with sensor assembly 36 allows measurement of misalignment of shaft 28 while shaft 28 is rotating. Existing systems incorporate sensors mounted independently from the rotating component (e.g., the shaft) such that one of the reflection target or the sensors is stationary relative to the other. Here, first sensor 40 rotates with first outer rim 16 (e.g., the target) and second sensor 42 rotates with second outer rim 24 (e.g., secondary target) allowing for measurement of changes during operation of flexible shaft assembly 10, with a secure mounting relationship between shaft 28 and sensors assembly 36, and prevent malfunction of more complex components such as strain gauges.

Additionally, flexible shaft assembly 10 with sensor assembly 36 can accomplish measurement of misalignment of shaft 28 with one or two sensors. Sensor assembly 36 eliminates sources of error associated with sensors attached to the stationary airframe. Flexible shaft assembly 10 with sensor assembly 36 places the sensor(s) on shaft 28 (smallest diameter part in flexible shaft assembly 10), thereby reducing centrifugal forces that can dislocate the sensor(s) off if at a larger diameter such as first or second outer rims 16 and 24 of first and second couplings 12 and 20. Flexible shaft assembly 10 with sensor assembly 36 eliminates the need for disassembly and reassembly associated with external sensors usage due to the capability of attaching split collar 38 onto shaft 28.

Adjustment of a gap between couplings and external sensors is eliminated with the placement of one or two sensors on shaft 28. Flexible shaft assembly 10 with sensor assembly 36 also allows for pre-installation of sensor assembly 36 on shaft 28 such that that a customer does not have to worry about installing sensors during their own installation and assembly. Sensor assembly 36 with its components provides self-powered sensors with storage or data transmission capability which eliminates considerable efforts during installation of flexible shaft assembly 10. With the ability to add sensor assembly 36 with collar 38 to any shaft, any driveshaft can be modified at the factory and returned to the customer for immediate use.

Figure 2:
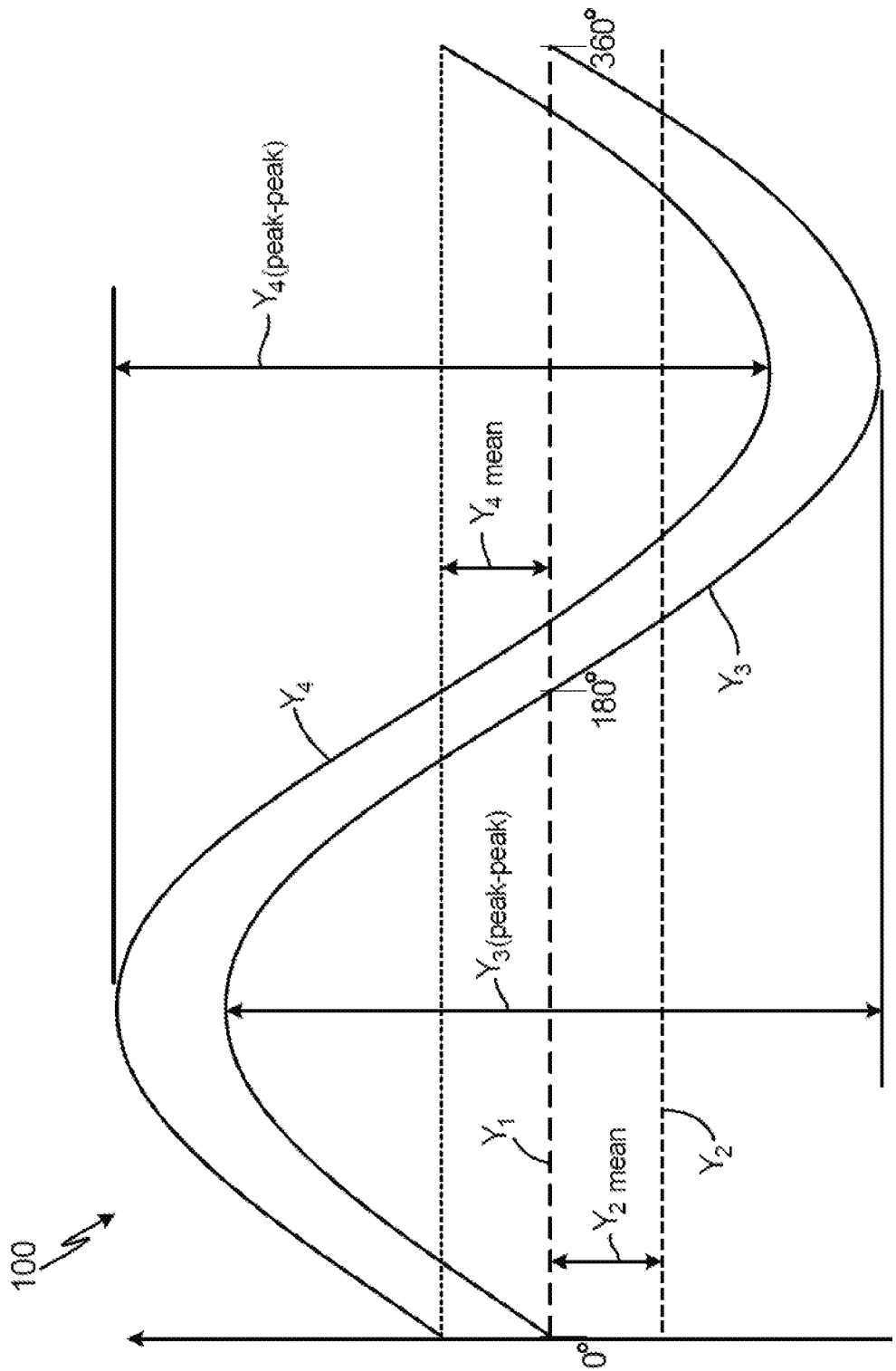
FIG. 2 is a graph of a signal collected during a revolution of the flexible shaft assembly for four different alignment conditions.

FIG. 2 shows graph 100 of signals collected during a full 360° revolution of flexible shaft assembly 10 for four different alignment conditions. The dependent, horizontal axis of graph 100 represents the degree of rotation, which in graph 100 ranges from 0° up to 360° (e.g., 0 radians up to 2π radians). The independent, vertical axis of graph 100 represents a peak-to-peak displacement (e.g., amplitude) of the signals. In this embodiment, the peak-to-peak displacement value represents a change in distance from sensor assembly 36 to first outer rim 16 as flexible shaft assembly 10 rotates around a full 360° revolution. As discussed herein with reference to FIG. 2, the sensing and/or measurement of first signal $Y_1$, second signal $Y_2$, third signal $Y_3$, and fourth signal $Y_4$ are measured/sensed between first sensor 40 of sensor assembly 36 and first outer rim 16 of first coupling 12 to determine an amount of misalignment between shaft 28 and first coupling 12. In another non-limiting embodiment, the following discussion can also apply to sensing and/or measurement of first signal $Y_1$, second signal $Y_2$, third signal $Y_3$, and fourth signal $Y_4$ as being measured/sensed between second sensor 42 of sensor assembly 36 and second outer rim 24 of second coupling 20 to determine an amount of misalignment between shaft 28 and second coupling 20.

The four different conditions are represented by first signal $Y_1$, second signal $Y_2$, third signal $Y_3$, and fourth signal $Y_4$. First signal $Y_1$ is a waveform signal that represents an aligned, neutral position of shaft 28 such that there is no axial or no angular misalignment between shaft 28 and first coupling 12. Second signal $Y_2$ is a waveform signal that represents an axial misalignment condition but not an angular misalignment condition. Third signal $Y_3$ is a sinusoidal waveform signal that represents an angular misalignment condition but not an axial misalignment condition. Fourth signal $Y_4$ is a sinusoidal waveform signal that represents combined axial and angular misalignment conditions.

Sensor assembly 36 measures the distance (e.g., distances $D_1$ and $D_2$) between first sensor 40 and the target (e.g., first outer rim 14 of first coupling 12). In a neutral position with no angular or axial displacement of shaft 28, distances $D_1$ and $D_2$ remain approximately equal such that the resultant amplitude of the sensed signal equals zero during the entire 360° revolution of shaft 28.

In a misalignment condition, for example when there is angular misalignment between first coupling axis 18 and shaft axis 34 of shaft 28, distances $D_1$ and $D_2$ change such that an absolute value of the difference between distances $D_1$ and $D_2$ becomes greater than zero. The distance from first sensor 40 to first outer rim 16 is measured by sensor assembly 36 as shaft 28 rotates 360° in one revolution. The measurement of the distance from first sensor 40 to first outer rim 16 creates a waveform signal as shown in FIG. 2. Angular misalignment is represented by a sinusoidal portion of the sensed signal. Signal analysis is used to calculate a peak-to-peak value of the waveform signal and trigonometry is used to convert the peak-to-peak value to angular misalignment. An axial position is represented by a mean of the waveform signal. The mean of the waveform signal is calculated using signal analysis. For example, anytime there is a change in the axial position of shaft 28, the mean of the waveform signal will change. This change in the waveform signal is then compared to a computed value from the neutral position (e.g., first signal $Y_1$ shown in FIG. 2) to calculate the axial displacement of shaft 28.

For example, the distance between first sensor 40 and first coupling 12 at an outer diameter of shaft 28 does not change as flexible shaft assembly 10 rotates. However, angular misalignment between first coupling axis 18 and shaft axis 34 cause first coupling 12 to tilt. A first point along first outer rim 16 (e.g., a gravitation top of first outer rim 16 as shown in FIG. 1B) moves closer to first sensor 40. A second point (e.g., a gravitational bottom of first outer rim 16 as shown in FIG. 1B) that is 180° away from the first point, moves away from first sensor 40. The total movement is the peak-to-peak value of the waveform signal for one full 360° revolution. Half of the peak-to-peak value can represent one side of a right triangle. For small displacements, the radius of first coupling 12 will be the other side of the right triangle. Assuming the small displacement as the short side of the right angle triangle, the amount of displacement can be converted into an angle α using a Tangent function as in Equation 1.

$$\tan(\alpha) = \frac{Y}{D} \qquad \text{Equation 1}$$

Where, Y=peak-to-peak displacement; and D=Diameter on coupling where measurement is being made=(2×Radius). Any degree of error in this assumption is very small and can be corrected, if necessary. Here in FIG. 2, signal $Y_3$ shows an example of the measured signal for a shaft that only has angular misalignment. The peak-to-peak value of signal $Y_3$ can be imputed into Equation 1 to compute the angular misalignment.

For pure axial displacement the reading at any two points 180° apart will be the same, for example not positive or negative compared to the neutral position distance. As shaft 28 rotates, the distance change will remain constant. Axial position is the mean of the signal for one 360° rotation. The mean is calculated by signal analysis. Anytime there is a change in the axial position of shaft 28, the mean of the waveform signal will change. This change is compared to the computed value from the neutral position (e.g., first signal $Y_1$) to calculate the axial displacement of shaft 28. Because there are two couplings, the total stretch or compression of shaft 28 will be twice the measured value. Referencing FIG. 2, signal $Y_2$ shows an example of the measured signal for shaft 28 subject to an axial position change relative to the neutral position. The mean value of signal $Y_2$ can be subtracted from the mean value of signal $Y_1$ to compute the axial displacement of shaft 28. For a condition with a combination of angular misalignment and axial displacement, the previous methods still apply. Referencing FIG. 2, signal $Y_4$ shows an example of the measured signal for shaft 28 subject to angular misalignment and axial displacement relative to the neutral position. The angular misalignment is computed by taking the peak-to-peak value of signal $Y_4$ and imputing it into Equation 1. The mean value of signal $Y_4$ can then be subtracted from the mean of signal $Y_1$ to compute the axial displacement of shaft 28.

Regarding the bending moments of first and second coupling 12 and 20, the ratio for the distribution of misalignment in the couplings (e.g., first and second couplings 12 and 20) with multiple diaphragms depends on the overall length of shaft 28 and the width of each diaphragm. Longer length shafts result in almost equal distribution, while very short shafts have unequal distribution, with the innermost diaphragm (e.g., at first outer rim 16 where measurements are taken) subjected to less angular displacement than the outer most diaphragm. When a length and width of shaft 28 and the widths of the coupling diaphragms are available, calculations will be made to determine the distribution. After the measurements, the data will be used to calculate a total misalignment between first coupling 12 and shaft 28. For example, in a coupling with four diaphragms, instead of four times the measured value, a factor slightly higher factor than four (e.g., 4.25) could be used as the ratio for the distribution of misalignment in the couplings.

Discussion of Possible Embodiments

A method for sensing misalignment of a rotating shaft includes rotating the shaft aligned along a shaft axis. A first coupling with a first rim and a first axis is mounted to a first end of the shaft and a second coupling with a second rim and a second axis is mounted to a second end of the shaft. A first sensor is coupled to a portion of the shaft such that the first sensor rotates with the shaft. A distance from the first sensor to the first rim of the first coupling is sensed as the shaft rotates with the first sensor. A change in the distance from the first sensor to the first rim of the first coupling is determined based on the sensed distance from the first sensor to the first rim of the first coupling. An angle of the first coupling is determined based on the sensed change in the distance from the first sensor to the first rim of the first coupling during one revolution of the shaft. An angle of the shaft is determined based on the sensed distance from the first sensor to the first rim of the first coupling representing the sensed change in the distance from the first sensor to the first rim of the first coupling during one revolution of the shaft.

The method of the preceding paragraph can optionally include, additionally and/or alternatively, any one or more of the following steps, features, configurations and/or additional components.

A signal can be emitted from the first sensor, the signal can be reflected with the first rim of the first coupling towards the first sensor, the reflected signal from the first rim of the first coupling can be detected, and/or the distance from the first sensor to the first rim of the first coupling can be determined based on a time of flight for the reflected signal to reach the first sensor.

The sensed distance from the first sensor to the first rim of the first coupling can be communicated to a transmitter mounted on the shaft, the sensed distance from the first sensor to the first rim of the first coupling can be transmitted to a receiver located externally from the shaft, and/or the sensed distance from the first sensor to the first rim of the first coupling can be communicated to a computer that is connected to the receiver.

A signal can be sent to a user interface during operation of the shaft, wherein the signal indicates the angle of the shaft.

A signal can be sent to a program memory during operation of the shaft, wherein the signal can indicate the angle of the shaft, a value of the angle of the shaft can be stored in the program memory, the program memory can be accessed to retrieve the value of the angle of the shaft, and/or the value of the angle of the shaft can be communicated to a user after operation of the shaft.

An amount of axial displacement of the shaft can be calculated.

The distance from the first sensor to the first outer rim can be measured as the shaft rotates an entire 360° revolution, a waveform signal representative of the measured distance from the first sensor to the first outer rim during the revolution of the shaft can be created, a peak-to-peak value of the waveform signal can be calculated, and/or the peak-to-peak value of the waveform signal can be converted to an amount of angular misalignment of the shaft.

A mean of the waveform signal can be calculated and/or a change in the mean of the waveform signal can be compared to a computed value from neutral position of the shaft.

A flexible shaft assembly includes a shaft, first and second couplings, and a sensor assembly. The first coupling includes a first outer rim and is mounted to a first end of the shaft. The second coupling is mounted to a second end of the shaft. The sensor assembly is mounted to the shaft and includes a collar and a first sensor. The collar is mounted onto an exterior surface of the shaft. The first sensor faces the first outer rim of the first coupling and is coupled to the collar such that the first sensor rotates with the collar as the collar is rotated with the shaft.

The assembly of the preceding paragraph can optionally include, additionally and/or alternatively, any one or more of the following features, configurations and/or additional components.

The sensor assembly can be mounted onto the shaft at a midpoint of the shaft.

An emitter can be configured to emit a signal, a signal sensing device can be operably connected to the emitter, and/or a power source can be connected to at least one of the emitter and the signal sensing device.

A second sensor can face a second outer rim of the second coupling.

The first sensor can be mounted at a first circumferential position, wherein the second sensor can be mounted at a second circumferential position that can be located 180 degrees relative to the first circumferential position of the first sensor.

A shaft misalignment measuring system includes a first coupling, a second coupling, a shaft, and a sensor assembly. The first coupling includes a first radially outer rim, wherein the second coupling includes a second radially outer rim. The shaft is connected to and extends between the first coupling and the second coupling. The sensor assembly is mounted on the shaft and includes a collar, a first sensor, and a second sensor. The collar is attached to the shaft. The first sensor is mounted to a first location of the collar and is configured to measure a change in angle of the first radially outer rim as the shaft rotates. The second sensor is mounted to a second location of the collar and is configured to measure a change in angle of the second radially outer rim as the shaft rotates.

The system of the preceding paragraph can optionally include, additionally and/or alternatively, any one or more of the following features, configurations and/or additional components.

A remote receiver unit can be disposed externally from the sensor assembly and the shaft, wherein the sensor assembly can be in wireless communication with the remote receiver assembly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for sensing misalignment of a rotating shaft, the method comprising:
    rotating the shaft aligned along a shaft axis, wherein a first coupling with a first rim and a first axis is mounted to a first end of the shaft, and a second coupling with a second rim and a second axis is mounted to a second end of the shaft, wherein a first sensor is coupled to a portion of the shaft such that the first sensor rotates with the shaft as the shaft is rotated;
    sensing a distance from the first sensor to the first rim of the first coupling as the shaft rotates with the first sensor;
    determining a change in the distance from the first sensor to the first rim of the first coupling based on the sensed distance from the first sensor to the first rim of the first coupling;
    determining an angle of the first coupling based on the change in the distance from the first sensor to the first rim of the first coupling during one revolution of the shaft based on the sensed change in the distance from the first sensor to the first rim of the first coupling; and
    determining an angle of the shaft based on the sensed distance from the first sensor to the first rim of the first coupling representing the sensed change in the distance from the first sensor to the first rim of the first coupling during one revolution of the shaft.

2. The method of claim 1, wherein sensing a distance from the first sensor to the first rim of the first coupling as the shaft rotates with the first sensor comprises:
    emitting a signal from the first sensor;
    reflecting the signal with the first rim of the first coupling towards the first sensor;
    detecting the reflected signal from the first rim of the first coupling; and
    determining the distance from the first sensor to the first rim of the first coupling based on a time of flight for the reflected signal to reach the first sensor.

3. The method of claim 1, further comprising:
    communicating the sensed distance from the first sensor to the first rim of the first coupling to a transmitter mounted on the shaft;
    transmitting the sensed distance from the first sensor to the first rim of the first coupling to a receiver located externally from the shaft; and
    communicating the sensed distance from the first sensor to the first rim of the first coupling to a computer that is connected to the receiver.

4. The method of claim 3, further comprising sending a signal to a user interface during operation of the shaft, wherein the signal indicates the angle of the shaft.

5. The method of claim 3, further comprising:
    sending a signal to a program memory during operation of the shaft, wherein the signal indicates the angle of the shaft;
    storing a value of the angle of the shaft in the program memory;
    accessing the program memory to retrieve the value of the angle of the shaft; and
    communicating the value of the angle of the shaft to a user after operation of the shaft.

6. The method of claim 1, further comprising calculating an amount of axial displacement of the shaft.

7. The method of claim 6, further comprising:
    measuring the distance from the first sensor to the first outer rim as the shaft rotates an entire 360° revolution;
    creating a waveform signal representative of the measured distance from the first sensor to the first outer rim during the revolution of the shaft;
    calculating a peak-to-peak value of the waveform signal; and
    converting the peak-to-peak value of the waveform signal to an amount of angular misalignment of the shaft.

8. The method of claim 7, wherein calculating the axial displacement of the shaft comprises:
    calculating a mean of the waveform signal; and
    comparing a change in the mean of the waveform signal to a computed value from neutral position of the shaft.

9. A flexible shaft assembly comprising:
    a shaft rotatable about a shaft axis;
    a first coupling mounted to a first end of the shaft, the first coupling with a first outer rim;
    a second coupling mounted to a second end of the shaft; and
    a sensor assembly mounted to the shaft, wherein the sensor assembly comprises:
        a collar mounted onto an exterior surface of the shaft; and
        a first sensor coupled to the collar such that the first sensor rotates with the collar as the collar is rotated with the shaft, wherein the first sensor faces the first outer rim of the first coupling.

10. The flexible shaft assembly of claim 9, wherein the sensor assembly is mounted onto the shaft at a midpoint of the shaft.

11. The flexible shaft assembly of claim 9, wherein the sensor assembly further comprises:
   an emitter configured to emit a signal;
   a signal sensing device operably connected to the emitter; and
   a power source connected to at least one of the emitter and the signal sensing device.

12. The flexible shaft assembly of claim 9, wherein the sensor assembly comprises a second sensor, wherein the second sensor faces a second outer rim of the second coupling.

13. The flexible shaft assembly of claim 12, wherein the first sensor is mounted at a first circumferential position, wherein the second sensor is mounted at a second circumferential position that is located 180 degrees relative to the first circumferential position of the first sensor.

14. A shaft misalignment measuring system comprising:
   a first coupling and a second coupling, wherein the first coupling includes a first radially outer rim, wherein the second coupling includes a second radially outer rim;
   a shaft connected to and extending between the first coupling and the second coupling; and
   a sensor assembly mounted on the shaft, wherein the sensor assembly comprises:
      a collar attached to the shaft;
      a first sensor mounted to a first location of the collar, wherein the first sensor is configured to measure a change in angle of the first radially outer rim as the shaft rotates; and
      a second sensor mounted to a second location of the collar, wherein the second sensor is configured to measure a change in angle of the second radially outer rim as the shaft rotates.

15. The shaft misalignment measuring system of claim 14, further comprising:
   a remote receiver unit disposed externally from the sensor assembly and the shaft, wherein the sensor assembly is in wireless communication with the remote receiver assembly.

* * * * *